United States Patent
Ahmavaara et al.

(10) Patent No.: US 8,233,934 B2
(45) Date of Patent: Jul. 31, 2012

(54) METHOD AND SYSTEM FOR PROVIDING ACCESS VIA A FIRST NETWORK TO A SERVICE OF A SECOND NETWORK

(75) Inventors: Kalle Ahmavaara, Helsinki (FI); Henry Haverinen, Jyväskylä (FI)

(73) Assignee: Nokia Corporation, Espoo (FI)

( * ) Notice: Subject to any disclaimer, the term of this patent is extended or adjusted under 35 U.S.C. 154(b) by 1271 days.

(21) Appl. No.: 10/529,346

(22) PCT Filed: Oct. 1, 2002

(86) PCT No.: PCT/IB02/04031
§ 371 (c)(1),
(2), (4) Date: Mar. 25, 2005

(87) PCT Pub. No.: WO2004/032554
PCT Pub. Date: Apr. 15, 2004

(65) Prior Publication Data
US 2005/0272465 A1 Dec. 8, 2005

(51) Int. Cl.
*H04M 1/00* (2006.01)
*H04W 4/00* (2009.01)
*H04K 1/00* (2006.01)

(52) U.S. Cl. ........ 455/552.1; 455/432.1; 455/432.3; 455/435.2; 370/338; 370/331; 370/341; 380/270; 380/272

(58) Field of Classification Search .......... 370/338, 370/331, 341; 455/432.1, 432.3, 435.2, 552.1; 380/270, 272
See application file for complete search history.

(56) References Cited

U.S. PATENT DOCUMENTS

| | | | |
|---|---|---|---|
| 2002/0034935 A1* | 3/2002 | Bjelland et al. | 455/403 |
| 2002/0056001 A1 | 5/2002 | Magee et al. | |
| 2002/0107964 A1* | 8/2002 | Tomoike | 709/225 |
| 2003/0014646 A1* | 1/2003 | Buddhikot et al. | 713/184 |
| 2003/0039237 A1* | 2/2003 | Forslow | 370/352 |
| 2003/0056096 A1* | 3/2003 | Albert et al. | 713/168 |
| 2003/0139180 A1* | 7/2003 | McIntosh et al. | 455/426 |
| 2003/0176188 A1* | 9/2003 | O'Neill | 455/433 |
| 2003/0220107 A1* | 11/2003 | Lioy et al. | 455/435.1 |
| 2005/0117591 A1* | 6/2005 | Hurtta et al. | 370/401 |

FOREIGN PATENT DOCUMENTS

| | | |
|---|---|---|
| WO | WO 00/44189 | 7/2000 |
| WO | WO 02/32084 | 4/2002 |
| WO | WO 02/067617 | 8/2002 |

OTHER PUBLICATIONS

IEEE Standard 802.11g; Part 11: Wireless LAN Medium Access Control (MAC) and Physical Layer (PHY) Specifications; Amendment 4: Further Higher Data Rate Extension in the 2.4 GHz Band; IEE Computer Society (2003).

(Continued)

*Primary Examiner* — Ariel Balaoing
(74) *Attorney, Agent, or Firm* — Mintz, Levin, Cohn, Ferris, Glovsky & Popeo, P.C.

(57) ABSTRACT

The present invention relates to a method and system for providing access from a first network (30) to a service of a second network, wherein an authentication signaling is used to transfer a service selection information to the second network (70). Based on the service selection information, a connection can be established to access the desired service. Thereby, cellular packet-switched services can be accessed over networks which do not provide a context activation procedure or corresponding control plane signaling function.

42 Claims, 2 Drawing Sheets

OTHER PUBLICATIONS

3GPP TS 23.003, V5.4.0, "3rd Generation Partnership Project; Technical Specification Group Core Network; Numbering addressing and identification", Release 5, Sep. 2002.

3GPP TS 23.060, V5.2.0, 3rd Generation Partnership Project; Technical Specification Group Services and System Aspects; General Packet Radio Service (GPRS); Service description; Stage 2, Release 5, (Jun. 2002).

* cited by examiner

| Code | Identifier | Length |
|---|---|---|
| Type | Subtype | Reserved |
| AT_SRES | Length | Reserved |
| SRES | | |
| APN parameter | | |

METHOD AND SYSTEM FOR PROVIDING ACCESS VIA A FIRST NETWORK TO A SERVICE OF A SECOND NETWORK

FIELD OF THE INVENTION

The present invention relates to a method and system for providing access via a first network, for example a Wireless Local Area Network (WLAN), to a service of a second network, for example a service subscribed to in a General Packet Radio Service (GPRS) network or a Universal Mobile Telecommunications System (UMTS) network.

BACKGROUND OF THE INVENTION

Over recent years, the market for wireless communications has enjoyed tremendous growth. Wireless technology now reaches or is capable of reaching virtually every location on the earth. With tremendous success of wireless telephony and messaging services, it is hardly surprising that wireless communication is beginning to be applied to the realm of personal and business computing. No longer bound by the harnesses of wired networks, people will be able to access and share information on a global scale nearly anywhere they venture.

The major motivation and benefit from WLANs is increased mobility. Network users can move about almost without restriction and access LANs from nearly everywhere. In addition to increased mobility, WLANs offer increased flexibility. Meetings can be arranged, in which employees use small computers and wireless links to share and discuss future design plans and products. Such "ad hoc" networks can be brought up and torn down in a very short time as needed, either around the conference table and/or around the world. WLANs offer the connectivity and the convenience of wired LANs without the need for expensive wiring or re-wiring.

However, even with the fastest laptop, productivity while travelling can fall because of poor access to the Internet or company Internet. Despite the revolution of the Global System for Mobile communication (GSM), laptop users need faster access to download large files and to synchronize their e-mails quickly. The emerging mobile information society demands that data is available whenever and wherever. As a solution to this problem an operator WLAN solution has been proposed which brings broadband access to the laptop or terminal device in specific places like airports, convention centers, hotels and meeting rooms. Thus, mobile network operators are able to offer broadband access to the internet, corporate intranets or other service machineries from virtually anywhere in the world. Thus, a public WLAN service with own WLAN roaming feature can be provided.

In packet-switched cellular networks, such as the GPRS or UMTS network, the users service descriptions are specified by Access Point Names (APN). GPRS is a common packet domain core network used for both GSM and UMTS networks. This common core network provides packet-switched services and is designed to support several quality of service levels in order to allow efficient transfer of non real-time traffic and real-time traffic. The Serving GPRS Support Node (SGSN) keeps track of the individual location of a mobile terminal and performs security functions and access control. The Gateway GPRS Support Node (GGSN) provides interworking with external packet-switched networks, and is connected with SGSNs via an IP-based packet domain backbone network. In the backbone network, the APN is in practice a reference to the GGSN to be used. In addition, the APN may, in the GGSN, identify the external network and optionally a service to be offered. Further details concerning the use and structure of APNs are defined e.g. in the 3GPP specification TS 23.003.

When a user connects to a GPRS service, i.e. establishes a Packet Data Protocol (PDP) context as specified e.g. in the 3GPP specifications TS 23.060, the APN information selected by the terminal device or user equipment (UE) or the user of the terminal device is sent from the terminal device to the network in a PDP context establishment signaling. This information consists of APN and optionally user-name and password if required to access the service behind the selected APN. In the GPRS network, this information is used to select suitable GGSN. The information also arrives to the selected GGSN and the GGSN uses this information further to establish a connection to a network node behind the GGSN, e.g. a corporate Internet or an operator service node. If provided, the username and password are delivered to the concerned network node behind the GGSN to allow authorization of the connection.

However, in the proposed public or operator WLAN systems, an operation similar to the GPRS PDP context activation is not provided. In particular, there is no dedicated signaling for setting up services between a WLAN terminal device, i.e. WLAN UE, and the WLAN network or network behind the WLAN network. Therefore, GPRS type of service selection and activation is not possible via the WLAN network, which thus forms a drawback in the proposed public or operator WLANs.

SUMMARY OF THE INVENTION

It is therefore an object of the present invention to provide a method and system for providing access from a WLAN network or any other first network to a service provided by a GPRS or any other second network.

This object is achieved by a method of providing access via a first network to a service facilitated by a second network, the method comprising the steps of:

using an authentication message to signal a service selection information via said first network to an authentication server means of said second network; and using said service selection information to connect to services provided over an access point indicated by said service selection information.

Furthermore, the above object is achieved by an authentication server device for providing an authentication mechanism, said authentication being arranged:

to extract from a received authentication message a service selection information for selecting a service; and to use said service selection information for establishing a connection to services provided over an access point indicated by said service selection information.

Additionally, the above object is achieved by a terminal device for providing access to a network service, said device being arranged to set in an authentication message a service selection information for selecting said network service.

Accordingly, a service selection information or service description is forwarded to the second network by using an authentication signaling between the terminal device and an authentication server of the second network, which then uses the service selection information to establish a connection to the desired or subscribed service. Thereby, access to network services of third parties is possible over the first network, e.g. the WLAN. Thus, dynamic service selection and multiple simultaneous connections to different services are enabled, and service continuity is obtained between different networks, such as WLANs and cellular packet-switched networks. Thereby, network flexibility and user mobility can be enhanced and service logics can be unified in different networks.

From the network operator's point of view, the proposed solution is advantageous in that current service description mechanisms, such as the APN mechanism in GPRS, can be used in new operator WLANs to thereby support legacy solutions. The authentication message may be a message of the Extensible Authentication Protocol (EAP). In particular, the authentication message may be an EAP response message.

The service selection information may comprise at least one APN parameter. This at least one APN parameter may comprise an APN, a username and a password of the desired service. Furthermore, the APN parameter may be encrypted in the authentication message. The applied encryption for different APN parameters may be selected differently, so that selected APN parameters may be forwarded by the authentication server to the selected access point in encrypted format, and that the selected APN parameters are decrypted only at the access point or selected service network.

BRIEF DESCRIPTION OF THE DRAWINGS

In the following, the invention will be described in greater detail based on a preferred embodiment with reference to the accompanying drawings, in which.

DESCRIPTION OF THE PREFERRED EMBODIMENT

Figure 1:
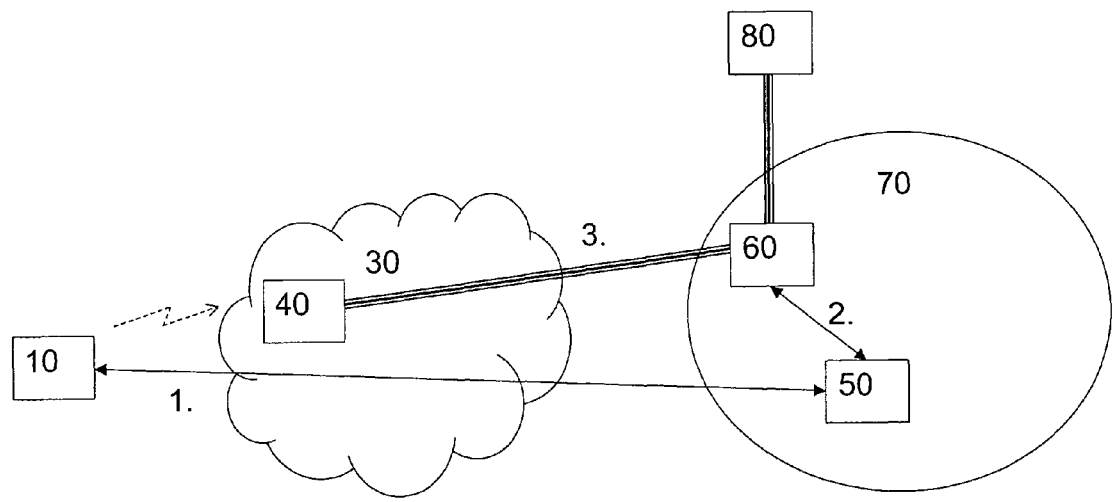
FIG. 1 shows a schematic block diagram indicating the basic principles underlying the present invention.
Figure 2:
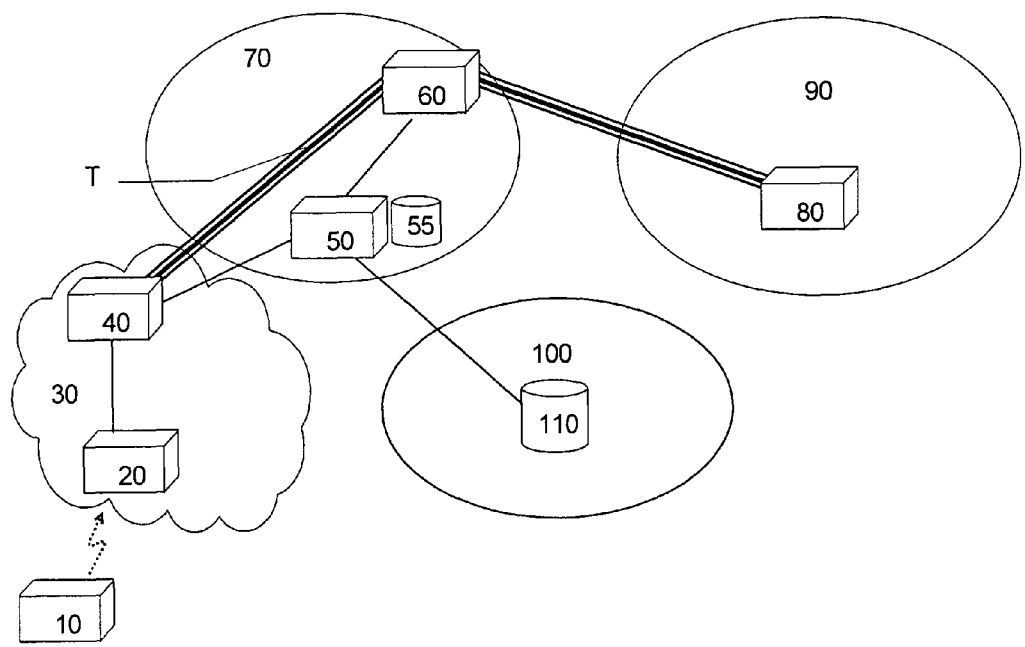
FIG. 2 shows a schematic block diagram of a WLAN connected via a WLAN gateway of a GPRS network to an application server.

The preferred embodiment will now be described on the basis of a network architecture as indicated in FIGS. 1 and 2, where a WLAN user is authenticated to access a WLAN network by an EAP authentication to thereby get access to a cellular packet-switched service.

FIG. 1 shows a schematic block diagram of a network architecture comprising a WLAN 30 and a GPRS network 70. A terminal device or UE 10 which is subscribed to a GPRS service and wishes to get access to the service, first transfers a service selection information indicating at least one APN parameter and an optional username and password via the WLAN 30 to an authentication server 50 of the GPRS network 70 by using an authentication signaling, e.g. an authorisation request message ($1^{st}$ step). Then, the authentication server 50 selects a WLAN gateway 60 arranged in the GPRS network 70, signals the service information to the WLAN gateway 60, and as a response receives from the WLAN gateway 60 a connection information for establishing a connection between an access server 40 of the WLAN 30 and an application server 80 providing the requested service and being identified by the at least one APN parameter ($2^{nd}$ step). In particular, the authorisation request may be forwarded further to the application server 80 or another external AAA server together with the username and password and the WLAN gateway 60 first receives a response from there and then proxies this response to the access server 40.

FIG. 2 shows a more detailed block diagram of a network architecture in which the preferred embodiment of the present invention can be implemented. In FIG. 2, a WLAN UE 10 is connected via a wireless connection to an access point 20 of a WLAN 30. It is noted that the access point 20 has a similar functionality as a base station in a general cellular network. The access point 20 is not mobile and forms part of the wired network infrastructure. Further details regarding the architecture and function of the WLAN network 30 can be gathered e.g. from the IEEE specification 802.11.

Furthermore, the WLAN 30 comprises a WLAN access server 40 for establishing a connection to external networks such as a GPRS network 70 or another packet-switched network 90, e.g. the Internet or an operator or company Internet. The GPRS network 70 comprises an authentication server 50, with an allocated authentication server database 55 in which subscriber information such as service profile information of each connected terminal device or UE are stored after retrieval of that information from a permanent subscriber database 110 at subscriber's home network 110. It is noted that the functionality of the authentication server 50 can also be located at users home network or a WLAN backbone or subsystem. The authentication signaling with the UE 10 may be based on the EAP SIM authentication protocol in case a GSM SIM card is used within the UE 10. Alternatively, the authentication may be based on the EAP AKA (Authentication and Key Agreement) authentication protocol in case. a UMTS SIM card is used within the UE 10.

The EAP protocol mechanism is used for authentication and session key distribution by means of the GSM SIM or the USIM. Authentication is based on a challenge-response mechanism, wherein the authentication algorithm which runs on the SIM or USIM card can be given a random number (RAND) as a challenge. The SIM or USIM runs an operator-specific confidential algorithm which takes the RAND and a secret key stored on the SIM or USIM as input, and produces a response (SRES) and a key as output. The key is originally intended to be used as an encryption key over the air interface. The authentication server 50 has an interface to the GSM or UMTS home network 100 of the UE 10 and operates as a gateway between the packet-switched AAA (Authentication, Authorization and Accounting) networks and the GSM or UMTS authentication infrastructure. After receiving an EAP identity response including user identification mappable to the user's International Mobile Subscriber Identity (IMSI) the authorization server 50 obtains n triplets or quintuplets from the authentication center at the home location register (HLR) or Home Subscriber Server (HSS) 110 of the user's home network 100. From the triplets, the authentication server 50 derives the keying material based on a cryptographic algorithm.

According to the preferred embodiment, the WLAN authentication signaling is used for signaling GPRS service subscription or selection information via the authentication server 50 to the GPRS network 70. The GPRS service information or service selection information comprises the APN of the desired service and an optional username and password required to connect to the service via the indicated APN. The authentication server 50 uses the obtained service selection information to select the WLAN gateway 60 having a similar function to a GGSN, from where the user can get access to the subscribed service. The subscribed service can be e.g. an access to a corporate Internet or to services of a mobile operator.

Figures 3, 4:
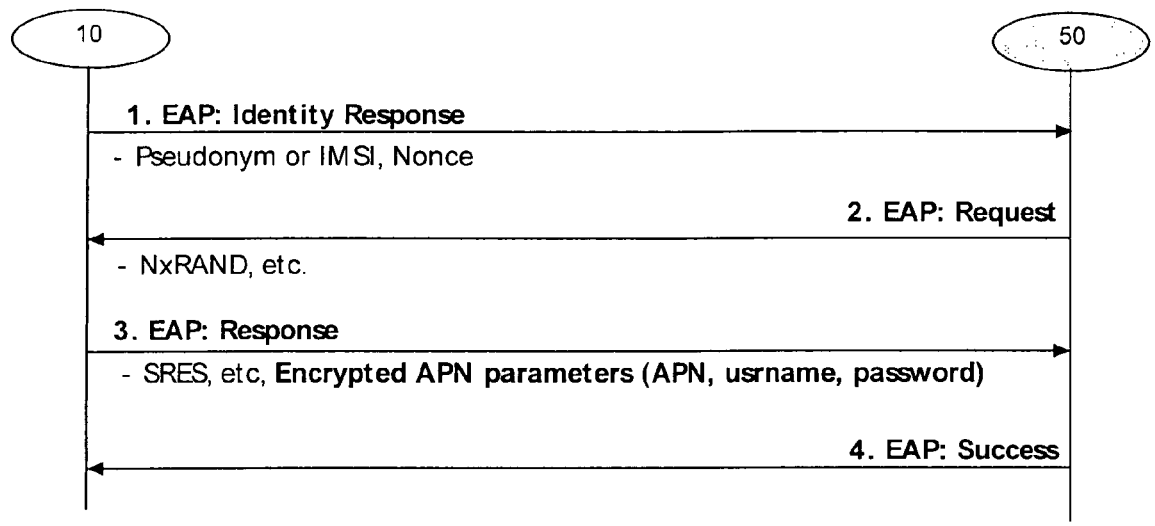
FIG. 3 shows an EAP signaling according the preferred embodiment of the present invention.
FIG. 4 shows the format of an enhanced EAP Response Challenge packet according to the preferred embodiment.

FIG. 3 shows a signaling diagram indicating an EAP-SIM authentication signaling between the UE 10 and the authentication server 50 of the GPRS network 70. The first EAP request (not shown) issued by the network is an EAP Identity Request. The client or UE 10 responds with an EAP Identity Response (step 1) comprising a pseudonym or IMSI. The pseudonym is used when an identity privacy support is being used by the UE 10. In response to the EAP Identity Response message or packet, the authentication server 50 sends an EAP challenge request comprising the n random numbers RAND among other parameters (step 2). In response thereto, the UE 10 issues an EAP Challenge Response including the calculated response value SRES. Furthermore, according to the preferred embodiment of the present invention, the EAP Challenge Response also includes at least one encryped APN parameter specifying the desired GPRS service to be accessed. The encrypted APN parameters my comprise the APN of the desired service and an optional username and password for getting access to the service (step 3). The applied encryption for different APN parameters may be selected differently. I.e., the APN itself may be the only APN parameter which is required for AP selection, and therefore only this parameter has to be in a format which is to be decrypted and/or read by the access server. The username and password parameters may be forwarded by the authentication server to the selected access point in encryped format, and these parameters are decrypted only at the access point or selected service network. It is thus not possible to access them while transferred via the first network. If the authentication procedure was successful, the authentication server 50 responds with an EAP Success message (step 4).

The above authentication signaling procedure enables a signaling of service selection parameters to the authentication server 50 without requiring any additional context activation function as would be required in a conventional GPRS network without WLAN functionality. To achieve this enhanced functionality of the authentication signaling, the client software at the UE 10 is modified or programmed to add the respective service selection information to the EAP Challenge Response message. In particular, if a user has selected to connect to a specific service identified by its APN, the service information or service selection information is configured in the client software at the UE 10. For each service the following settings may be performed. Firstly, a free text entry identifying the service for the user may be set. Secondly, the APN, i.e. the identification of the Public Land Mobile Network (PLMN) plus the Domain Name Server (DNS) name assigned by the Mobile Operator (MO) may be set to point to the specific service, and, thirdly, a setting indicating whether the username and password are required (e.g. a Yes/ No setting) can be made in the client software. The third setting may comprise a setting indicating either a predefined or a dynamic username or/and password setting.

At the latest after reception of the EAP request message, the UE 10 gets the required service selection related information from the user and encrypts it as specified by the utilised signalling protocol such as EAP-SIM. The UE 10 then inserts the APN parameter information to the EAP Challenge Response message and sends it via the WLAN 30 to the authentication server 50.

FIG. 4 shows a format of the enhanced EAP SIM Challenge Response message according to the preferred embodiment as generated at the SIM. A "code" field is used to identify the message as a response message. An "identifier" field is one octet and aids in matching replies to responses. In particular, the "identifier" field must match the "identifier" field of the message to which it is sent in response. The "length" field indicates the length of the EAP message or packet. The "type" and "sub-type" fields are set to specific values specifying the EAP SIM Challenge Response message. The "reserved" fields are set to zero upon sending and ignored on reception. The "AT_SRES" field indicates an attribute value and is followed by an additional "length" field indicating the length of the following SRES value and by a "reserved" field. Finally, the proposed APN parameters specifying the requested service may be added e.g. as encrypted values.

It is noted that the present invention is not restricted to the described WLAN and GPRS service and can be used in any network architecture where a control plane signaling required for accessing a packet-switched service is not provided in the access network. The functionalities of the authentication server 50 and the gateway 60 not necessarily have to be GPRS functionalities, but can be located in any backbone network or subsystem of the WLAN or any other network accessible by the WLAN 30. They may be provided in standalone server devices or in GPRS GGSN or SGSN functionalities, respectively. Also, the accessed service does not have to be a GPRS service. Thus, the WLAN UE 10 can be a single-mode WLAN terminal without GPRS functionality but with a functionality to access external services via an authentication signaling, e.g. by a similar mechanism as the GPRS service selection mechanism. Furthermore, any given authentication message can be used for transferring the service selection information. The preferred embodiments may thus vary within the scope of the attached claims.

The invention claimed is:

1. A method, comprising:
transmitting an authentication message to signal service selection information via a first network to an authentication server of a second network, the service selection information indicating an access point, wherein the first and second networks are distinct, wherein the authentication message signals the service selection information via the first network to an authentication server of the second network; and
using the service selection information to connect to at least one service provided over the access point indicated by the service selection information,
selecting, using the service selection information, a gateway in the second network to connect to the first network;
wherein the service selection information comprises at least one of an access point name parameter, a username, and a password, and
wherein the at least one access point name parameter is encrypted in the authentication message so that the access point name parameter can be decrypted or read by an access server, and the user name and the password can only be decrypted at a network defined by the access point name parameter.

2. A method according to claim 1, wherein the first network comprises a wireless local area network, wherein the second network comprises a cellular packet-switched network different from the first network, and the authentication message comprises an extensible authentication protocol message.

3. A method according to claim 1, wherein the second network is a cellular packet-switched network.

4. A method according to claim 3, wherein the cellular packet-switched network is a general packet radio service network.

5. A method according to claim 1, wherein the authentication message is an extensible authentication protocol message.

6. A method according to claim 5, wherein the extensible authentication protocol message is an extensible authentication protocol subscriber identity module or extensible authentication protocol authentication and key agreement message.

7. A method according to claim 5, wherein the authentication message is an extensible authentication protocol challenge response message.

8. An apparatus, comprising:
a processor configured to connect first and second distinct networks and extract from a received authentication message a service selection information to select a service, wherein the authentication message signals the service selection information via the first network to an authentication server of the second network,
wherein the processor is configured to use the service selection information to establish a connection to services provided over an access point indicated by the service selection information,
wherein the service selection information comprises at least one of an access point name parameter, a username, and a password,
wherein the processor is configured to select a gateway in the second network to connect to the first network; and
wherein the at least one access point name parameter is encrypted in the authentication message so that the access point name parameter can be decrypted or read by an access server, and the user name and the password can only be decrypted at a network defined by the access point name parameter.

9. The apparatus according to claim 8, wherein the received authentication message is based on an extensible authentication protocol.

10. The apparatus according to claim 9, wherein the received authentication message is an extensible authentication protocol challenge response message.

11. The apparatus according to claim 8, wherein the processor is a standalone wireless local area network authentication server.

12. The apparatus according to claim 8, wherein the processor is a gateway general packet radio service support node.

13. The apparatus according to claim 8, wherein the at least one access point name parameter is decrypted in the processor.

14. The apparatus according to claim 8, wherein the at least one access point name parameter is forwarded by the processor to the access point in an encrypted manner.

15. An apparatus, comprising:
a processor configured to connect first and second distinct networks and to transmit, in an authentication message, a service selection information regarding selection of a network service, wherein the authentication message signals the service selection information via the first network to an authentication server of the second network,
wherein the service selection information comprises at least one of an access point name parameter, a username, and a password, and
wherein the at least one access point name parameter is encrypted in the authentication message so that the access point name parameter can be decrypted or read by an access server, and the user name and the password can only be decrypted at a network defined by the access point name parameter,
wherein the service selection information is configured to select a gateway in the second network to connect to the first network.

16. The apparatus according to claim 15, wherein the authentication message is an extensible authentication protocol message.

17. The apparatus according to claim 16, wherein the extensible authentication protocol message is an extensible authentication protocol challenge response message.

18. The apparatus according to claim 17, wherein the extensible authentication protocol challenge response message is an extensible authentication protocol subscriber identity module or extensible authentication protocol authentication and key agreement challenge response message.

19. The apparatus according to claim 15, wherein the service is a general packet radio service.

20. A system, comprising:
a terminal device connected to a first network configured to provide access to a network service, the terminal device configured to set, in an authentication message, a service selection information regarding selection of the network service, wherein the authentication message signals the service selection information via the first network to an authentication server of a second network; and
an authentication server device connected to the second network, the authentication server device configured to provide an authentication mechanism, the authentication server device configured to extract from a received authentication message the service selection information to select the service, and to use the service selection information to establish a connection to services provided over an access point indicated by the service selection information, wherein the authentication server is configured to select a gateway in the second network to connect to the first network,
wherein the service selection information comprises at least one of an access point name parameter, a username, and a password,
wherein the first and second networks are distinct, and
wherein the at least one access point name parameter is encrypted in the authentication message so that the access point name parameter can be decrypted or read by an access server, and the user name and the password can only be decrypted at a network defined by the access point name parameter.

21. A method, comprising:
extracting, by a processor coupled to a second network, from a received authentication message received via a first network a service selection information to select a service;
selecting, using the processor coupled to the second network, a gateway in the second network to connect to the first network, wherein the authentication message signals the service selection information via the first network to an authentication server of the second network; and
using, by the processor coupled to the second network, the service selection information to establish a connection to services provided over an access point indicated by the service selection information,
wherein the service selection information comprises at least one of an access point name parameter, a username, and a password,
wherein the first and second networks are distinct, and
wherein the at least one access point name parameter is encrypted in the authentication message so that the access point name parameter can be decrypted or read by an access server, and the user name and the password can only be decrypted at a network defined by the access point name parameter.

22. A method, comprising:
setting in an authentication message sent via a first network to a second network a service selection information regarding selection of a network service at a terminal device, wherein the authentication message signals the service selection information via the first network to an authentication server of the second network;
selecting a gateway in the second network to connect to the first network;
wherein the service selection information comprises at least one access point name parameter, a username, and a password,
wherein the first and second networks are distinct, and
wherein the at least one access point name parameter is encrypted in the authentication message so that the access point name parameter can be decrypted or read by an access server, and the user name and the password can only be decrypted at a network defined by the access point name parameter.

23. A non-transitory computer-readable storage medium encoded with instructions configured to control a processor to perform a process, the process comprising:
transmitting an authentication message to signal a service selection information via a first network to a second network, wherein the first and second networks are distinct;
using the service selection information to select a gateway in the second network to connect to the first network, wherein the authentication message signals the service selection information via the first network to an authentication server of the second network; and
using the service selection information to connect to services provided over an access point indicated by the service selection information,
wherein the service selection information comprises at least one access point name parameter, a username, and a password, and
wherein the at least one access point name parameter is encrypted in the authentication message so that the access point name parameter can be decrypted or read by an access server, and the user name and the password can only be decrypted at a network defined by the access point name parameter.

24. A non-transitory computer-readable storage medium encoded with instructions configured to control a processor to perform a process, the process comprising:
extracting, using a processor connected to a second network, from a received authentication message from a first network, a service selection information to select a service, wherein the authentication message signals the service selection information via the first network to an authentication server of the second network;
selecting a gateway in the second network to connect to the first network, wherein the first and second networks are distinct;
using the service selection information to establish a connection to services provided over an access point indicated by the service selection information,
wherein the service selection information comprises at least one access point name parameter, a username, and a password, and
wherein the at least one access point name parameter is encrypted in said authentication message so that the access point name parameter can be decrypted or read by an access server, and the user name and the password can only be decrypted at a network defined by the access point name parameter.

25. A non-transitory computer-readable storage medium encoded with instructions configured to control a processor to perform a process, the process comprising:
setting in an authentication message a service selection information regarding selection of a network service,
sending the authentication message from via a first network to an authentication server coupled to a second network, wherein the first and second networks are distinct, and wherein the authentication message signals the service selection information via the first network to an authentication server of the second network to enable selection of a gateway in the second network to connect to the first network;
wherein the service selection information comprises at least one access point name parameter, a username, and a password, and
wherein the at least one access point name parameter is encrypted in the authentication message so that the access point name parameter can be decrypted or read by an access server, and the user name and the password can only be decrypted at a network defined by the access point name parameter. access server, and the user name and the password can only be decrypted at a network defined by the access point name.

26. The method according to claim 21, wherein the received authentication message is based on an extensible authentication protocol.

27. The method according to claim 26, wherein the received authentication message is an extensible authentication protocol challenge response message.

28. The method according to claim 21, further comprising: decrypting the at least one access point name parameter.

29. The method according to claim 21, further comprising: forwarding the at least one access point name parameter to the access point in an encrypted manner.

30. The method according to claim 22, wherein the authentication message is an extensible authentication protocol message.

31. The method according to claim 30, wherein the extensible authentication protocol message is an extensible authentication protocol challenge response message.

32. The method according to claim 31, wherein the extensible authentication protocol challenge response message is an extensible authentication protocol subscriber identity module or extensible authentication protocol authentication and key agreement challenge response message.

33. The method according to claim 22, wherein the service is a general packet radio service.

34. An apparatus, comprising:
extracting means connected to a second network for extracting from a received authentication message from a first network, a service selection information to select a service, wherein the authentication message signals the service selection information via the first network to an authentication server of the second network; and
controlling means for using the service selection information to establish a connection to services provided over an access point indicated by the service selection information, and for selecting a gateway in the second network to connect to the first network, wherein the first and second networks are distinct,
wherein the service selection information comprises at least one access point name parameter, a username, and a password, and
wherein the at least one access point name parameter is encrypted in the authentication message so that the access point name parameter can be decrypted or read by an access server, and the user name and the password can only be decrypted at a network defined by the access point name parameter.

35. An apparatus, comprising:
a processor configured to set in an authentication message a service selection information regarding selection of a network service and configured to send the authentication message through a first network to a second network, wherein the first and second networks are distinct, wherein the authentication message is used by the second network to select a gateway in the second network to connect to the first network,
wherein the service selection information comprises at least one of an access point name parameter, a username, and a password, and
wherein the at least one access point name parameter is encrypted in the authentication message so that the access point name parameter can be decrypted or read by an access server, and the user name and the password can only be decrypted at a network defined by the access point name parameter.

36. A method comprising:
setting in an authentication message a service selection information regarding selection of a network service; and
sending the authentication message through a first network to a second network, wherein the first and second networks are distinct, wherein the authentication message is used by the second network to select a gateway in the second network to connect to the first network,
wherein the service selection information comprises at least one of an access point name parameter, a username, and a password, and
wherein the at least one access point name parameter is encrypted in the authentication message so that the access point name parameter can be decrypted or read by an access server, and the user name and the password can only be decrypted at a network defined by the access point name parameter.

37. method according to claim 36, wherein the first network comprises a wireless local area network, wherein the second network comprises a cellular packet-switched network different from the first network, and the authentication message comprises an extensible authentication protocol message.

38. A method according to claim 36, wherein the second network is a cellular packet-switched network.

39. A method according to claim 36, wherein the authentication message is an extensible authentication protocol message.

40. A method according to claim 39, wherein the extensible authentication protocol message is an extensible authentication protocol subscriber identity module or extensible authentication protocol authentication and key agreement message.

41. A method according to claim 5, wherein the authentication message is an extensible authentication protocol challenge response message.

42. A non-transitory computer-readable storage medium encoded with instructions configured to control a processor to perform a process, the process comprising:
setting in an authentication message a service selection information regarding selection of a network service; and
sending the authentication message through a first network to a second network, wherein the first and second networks are distinct, wherein the authentication message is used by the second network to select a gateway in the second network to connect to the first network,
wherein the service selection information comprises at least one of an access point name parameter, a username, and a password, and
wherein the at least one access point name parameter is encrypted in the authentication message so that the access point name parameter can be decrypted or read by an access server, and the user name and the password can only be decrypted at a network defined by the access point name parameter.

* * * * *